Patented Oct. 28, 1924.

1,512,924

UNITED STATES PATENT OFFICE.

ANTON HAMBLOCH, OF ANDERNACH, GERMANY.

PROCESS FOR THE PREPARATION OF MAGNESIUM CARBONATE.

No Drawing. Application filed January 11, 1923. Serial No. 612,094.

*To all whom it may concern:*

Be it known that I, ANTON HAMBLOCH, a citizen of Germany, residing at Andernach, Province of the Rhine, Germany, have invented certain new and useful Improvements in a Process for the Preparation of Magnesium Carbonate, of which the following is a specification.

Heretofore there has been described a process for the preparation of magnesium carbonate from magnesium carbonates containing calcium, which is carried out as follows: Either the mineral containing the magnesium in the form of a carbonate is itself, or the products obtained by calcining the same are ground small, then mixed with alkali metal carbonates or with alkali metal bicarbonates, dissolved in water saturated with carbon dioxide under or without pressure and heated to a temperature of 60–70° C., by which means the magnesium carbonate forms a double carbonic acid salt with the alkali metal carbonate or alkali metal bicarbonate dissolved in the water which contains carbon dioxide, the calcium content of the mineral, however, remaining behind in the form of an insoluble calcium carbonate. The solution containing the double carbonic acid salt is now decanted from the undissolved calcium carbonate which remains behind and other residues, which contain also the iron content of the mineral and the silica and alumina separated by means of the carbonic acid and is heated to a temperature of 100° C., in which case the double carbonic acid salt decomposes into a soluble alkali metal carbonate and an insoluble magnesium carbonate, which is precipitated from the solution. The alkali metal carbonate remaining behind in solution can be employed for the treatment of further calcium and magnesium containing minerals, as well as the carbon dioxide.

If the solution saturated with carbon dioxide ($CO_2$) of the acid double alkali metal magnesium salts, which according to the foregoing invention, are obtained by the above mentioned disintegration of the magnesium containing minerals, be heated in a vacuum, then magnesia in the form of magnesium carbonate tri-hydrate separates itself.

Having now particularly described and ascertained the nature of my said invention and in what manner the same is to be performed, I declare that what I claim is:—

The process of preparing magnesium carbonate from a solution of an acid double alkali metal magnesium carbonate formed by the treatment of material containing magnesium compounds in water saturated with carbon dioxide, which consists in heating said solution under a vacuum whereby magnesium carbonate tri-hydrate is precipitated.

Dated this 16th day of December 1922.

ANTON HAMBLOCH.